United States Patent
Nakajima

[11] Patent Number: 5,935,006
[45] Date of Patent: Aug. 10, 1999

[54] DEBUG APPARATUS AND METHOD FOR DEBUGGING GAME PROGRAM IN ROM CARTRIDGE

[75] Inventor: Tomohiko Nakajima, Hokkaido, Japan

[73] Assignee: Hudson Soft Co., Ltd., Hokkaido, Japan

[21] Appl. No.: 08/770,570

[22] Filed: Dec. 19, 1996

[30] Foreign Application Priority Data

Dec. 25, 1995 [JP] Japan .................................... 7-350904

[51] Int. Cl.⁶ ........................................................ A63F 9/22
[52] U.S. Cl. ........................................................ 463/44
[58] Field of Search .................... 463/1, 31, 43, 463/44; 395/183.14, 704

[56] References Cited

U.S. PATENT DOCUMENTS 3,987,420 10/1976 Badaguani ............................... 395/704
4,949,298 8/1990 Nakanishi et al. .
5,267,734 12/1993 Stamper et al. .
5,377,997 1/1995 Wildin et al. ................................ 463/1
5,592,609 1/1997 Sazaki et al. .............................. 463/31

FOREIGN PATENT DOCUMENTS

0 356 237 A2  2/1990  European Pat. Off. .

*Primary Examiner*—Michael O'Neill
*Attorney, Agent, or Firm*—McDermott, Will & Emery

[57] ABSTRACT

In a developing environment, a game program exists in a product ROM and a debug program exists in another ROM which is a test ROM. The debug program includes a time adjusting program and other debug routine programs. The game program includes some statements for the debug program. When a ROM cartridge is produced as a product ROM cartridge, the test ROM is detached from the ROM cartridge and the statements for the debug program are deleted from the game program in the product ROM. The deleted area in the product ROM is left as an unusable area. However, the deleted area is very few, because the size of the statements for debug program is much fewer than the size of the debug program. Therefore, the game program is able to use almost all product ROM area.

2 Claims, 8 Drawing Sheets

DEBUG APPARATUS AND METHOD FOR DEBUGGING GAME PROGRAM IN ROM CARTRIDGE

FIELD OF THE INVENTION

The invention relates to a debug apparatus and a method for debugging a game program in a ROM (Read-Only memory) cartridge, and more particularly, to debug apparatus and a method for debugging a program of a virtual reality type game, which are played by using time and clock functions, in a ROM (Read-only Memory)

BACKGROUND OF THE INVENTION

A conventional game system comprises a game unit and a ROM cartridge. The game unit has a CPU (Central Processing Unit), a RAM (Random Access Memory), a ROM (Read-Only Memory), I/O (input/Output) interfaces, and a timer. The ROM cartridge has an I/O interface and a ROM for storing a game program. The game unit and the ROM cartridge are connected with each other through the each I/O interface.

In developing a game program, when the error is occurred during playing a game, a manner called as "check-print" is generally used by a debugger. In the check-print, the debugger selects an error factor and an error point in a game program, then "check-print" commands are inserted into any points of the game program in related with the error factor and point. Next, the results of the check-prirt commands are outputted, then the debugger examines the results. In this manner, the error of the game program is debugged.

In the conventional debug apparatus and method for debugging a game program, however, there are disadvantages in that a game program area in a ROM is eroded, because, a debug program as well as the game program exists in the ROM.

SUMMARY OF THE INVENTION

Accordingly, it is an object of the invention to provide a debug apparatus and method for debugging a game program in which the game program is able to use almost all ROM area.

According to the first feature of the invention, an external storage in a game apparatus for debugging a game program by a debug program comprises first storing means for storing the game program and second storing means for storing the debug program.

According to the second feature of the invention, a method for debugging a game program in a game apparatus with an external storage comprises the steps of storing the game program into first storage of the external storage, storing the debug program into second storage of the external storage, and debugging the game program by using the debug program.

BRIEF DESCRIPTION OF THE DRAWINGS

The invention will be described in more detail in conjunction with the accompanying drawings, wherein.

DETAILED DESCRIPTION OF THE PREFERRED EMBODIMENTS

Before explaining a debug apparatus and method for debugging a game program in the preferred embodiment according to the invention, the above mentioned conventional debug apparatus and method for debugging a game program will be explained in FIGS. 1 to 3.

A conventional game apparatus comprises a game unit and a ROM cartridge. The game unit has a CPU (Central Processing Unit), a RAM (Random Access Memory), a ROM (Read-Only Memory), I/O (Input/output) interfaces, and a timer. A conventional ROM cartridge has an I/O interface and a ROM for storing a game and a debug program. The game unit and the conventional ROM cartridge are connected with each other through the each I/O interface.

In developing a game program, a game program debug wastes working-time and working-load. Game program errors includes three types errors which are a compile error, a link error and an executing error. The compile error and link error are easy to be debugged, because each error point of the two types errors is detected by a compiler or a linker in a computer system.

On the other hand, the executing error is hard to be debugged, because the computer system does not detect an error point of the executing error. In particular, when the game program is ended without hanging up the game program at the midge and the result of the game program is incorrect, the executing error is very hard to be debugged.

Therefore, when the executing error is occurred, a manner called as "check-point" is generally used by a debugger. The check-point is to output contents of a point indicated by the debugger in the game program. In the check-point, the debugger selects an error factor and an error point in a game program, then "check-point" commands are optionally inserted into any points of the game program in related with the error factor and point. Next, the results of the checkpoint commands are outputted, then the debugger examines the results. In this manner, the executing error of the game program is debugged.

On the other hand, a game apparatus with a RTC (Real Time Clock) for playing a virtual reality type game is developed. The RTC is an IC (Integrated Circuit) having a clock function and a calendar function. A virtual real time of a game is corresponded with a real time by the clock function and the calendar function in the RTC. Namely, the RTC saves year, month, day, lay of the week, hour, minute, and second of the real time therein as the virtual real time of the game by using the clock function and the calendar function.

Figure 1:
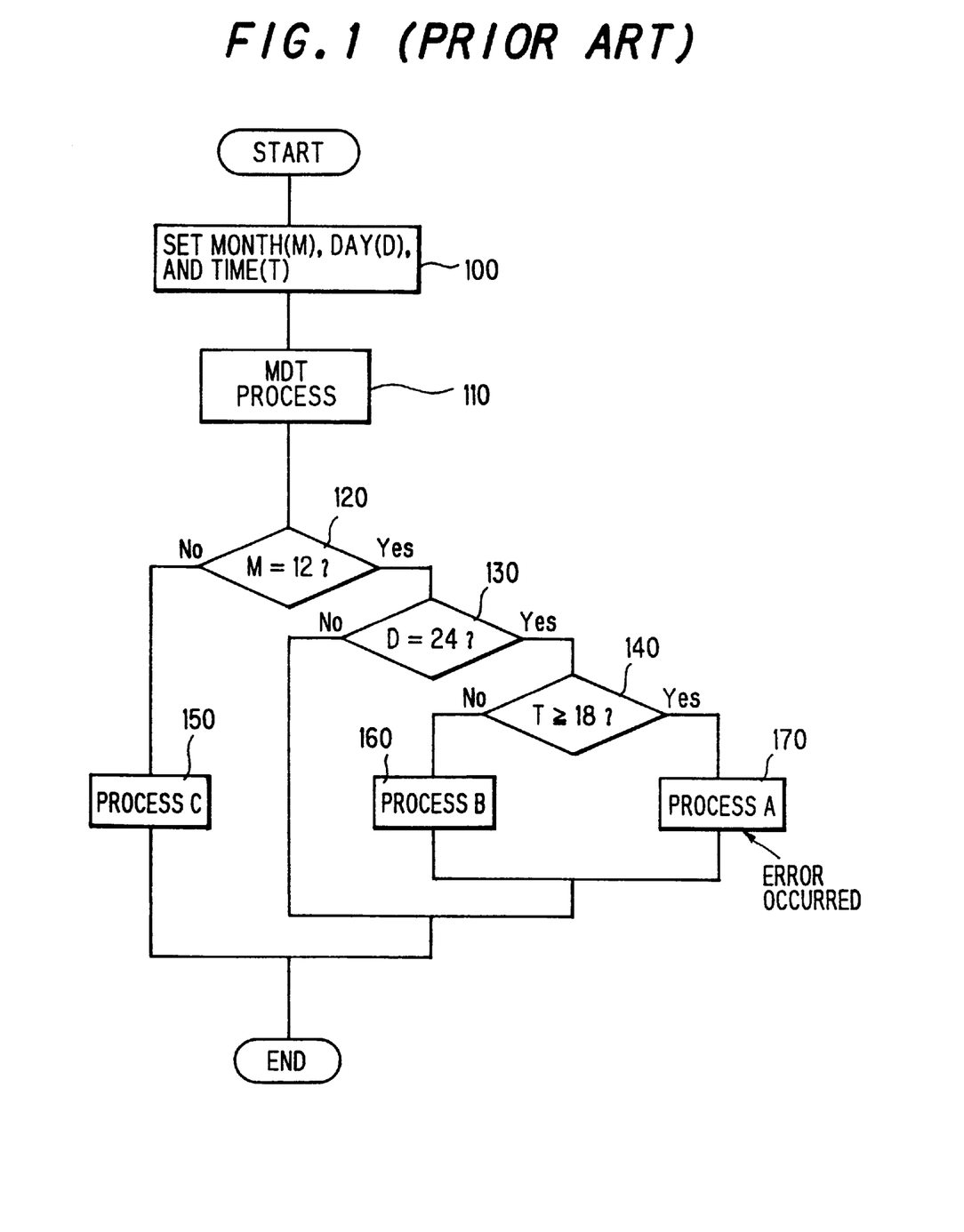
FIG. 1 is a flow chart of a time process of a virtual reality type game.

FIG. 1 is a flow chart of a time process of a virtual reality type game. In FIG. 1, a game program processes a virtual real time including month, day, and clock time. In the time process, the virtual real time including month (M), day (D), and clock time (T) is set into the game program from a RTC at the step 100. At the step 110, the M, D, and T of the game program is processed (MDT process). At the step 120, if the m is equal to "12", then the step 130 follows, else the step 150 follows and a process C is executed. At the step 130, if the D is equal to "124", then the step 140 follows, else the time process ended. At the step 140, if the T is less than "18", then the step 160 follows and a process B is executed, else the step 170 follows and a process A is executed.

In this case, a conventional debug apparatus and method for debugging a game program are explained on assumption that an error has occurred in the process A.

Figure 2:
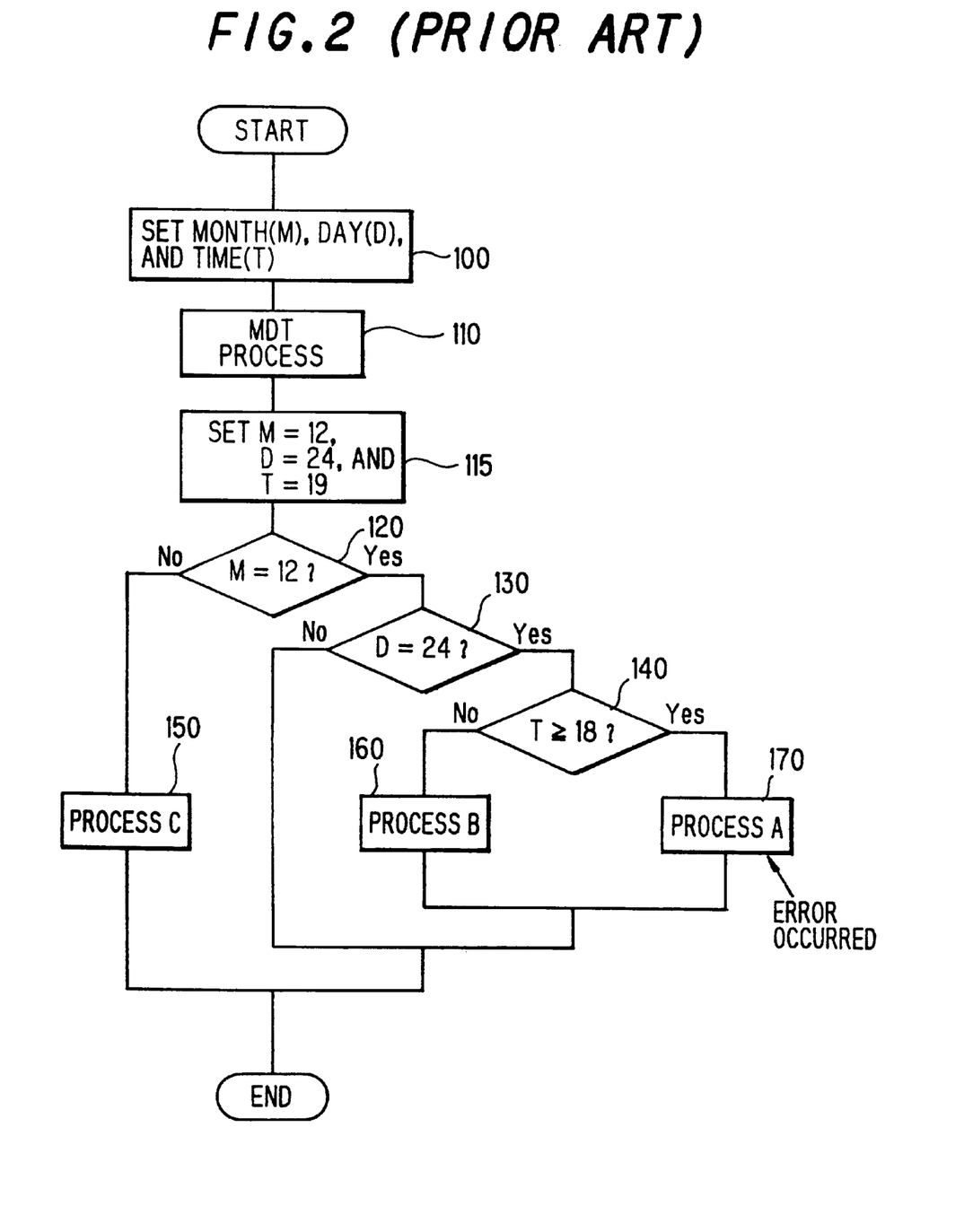
FIG. 2 is a flow chart of a debug process of the time process in FIG. 1.

FIG. 2 is a flow chart of a debug process of the time process in FIG. 1. In FIG. 2, the step 115 is inserted into between the step 110 and the step 120 to reproduce the error at the process A. At the step 115, the M, D, and T are set to be "12", "24", "19", respectively. Therefore, the step 170 follows through the step 120, 130, and 140. Then the error is reproduced in the process A at the step 170. The debugger can debug the game program based on the reproduced error.

Further, in the above case, at sharing one debug PC (Personal Computer), if the timer in the PC is changed by one developer, tests of other developers are affected.

Figure 3:
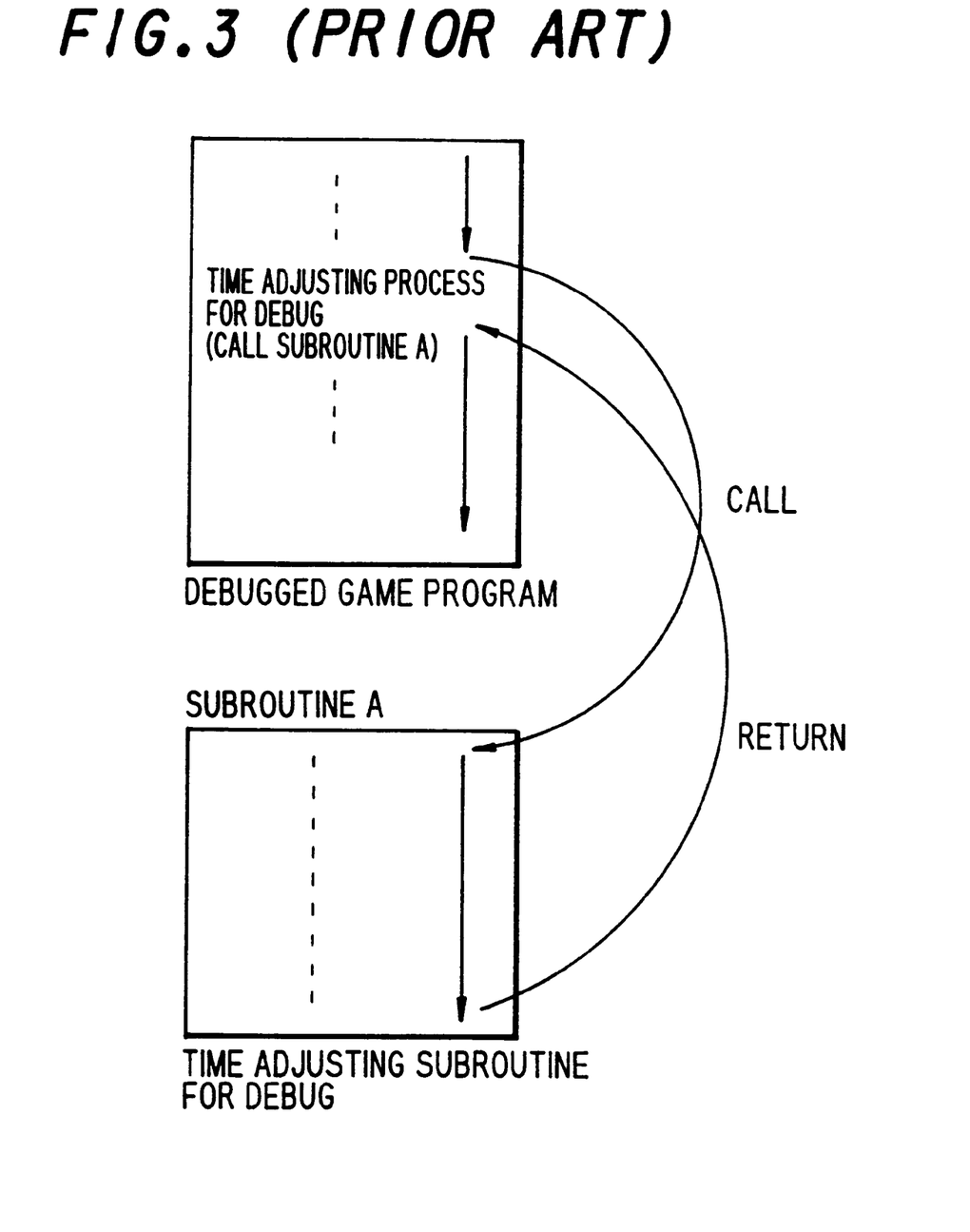
FIG. 3 is a block diagram of a debug process of a game program.

FIG. 3 is a block diagram of a debug process of a game program. A debug program is created in a ROM as a subroutine A which is a time adjusting subroutine for the debug process. A call statement to call the subroutine A is inserted into a game program which is debugged. When the subroutine A is called in the game program, the subroutine A is executed. Then, when the subroutine A is ended, a game process control is returned to the game program.

In a virtual reality type game, an error situation of the game program using the virtual real time is hard to be reproduced, because, an event of the game is often inconsistent with a time of the game. Specially, when the event of the game is affected by other factors such as year and day of the week, the error situation often is very hard to be reproduced in the game.

In the virtual reality type game, therefore, the subroutines of a debug process use a large quantity of memory area to consider all error factors.

Figure 4:
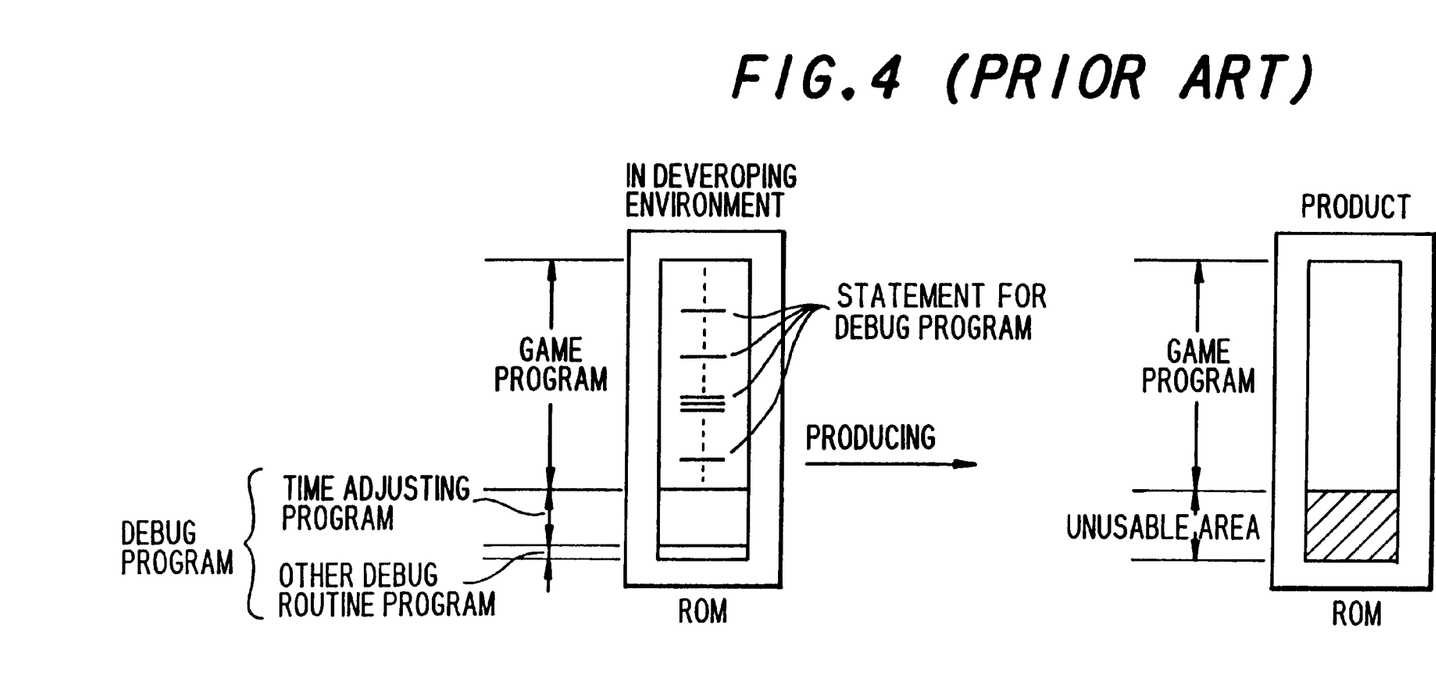
FIG. 4 is a block diagram of a ROM in a conventional ROM cartridge.

FIG. 4 is a block diagram of a ROM in a conventional ROM cartridge. In a developing environment, a debug program and a game program exists in a same ROM. The debug program includes a time adjusting program and other debug routine programs. The game program includes some statements for the debug program. When a ROM cartridge is produced as a product ROM cartridge, the debug program and the statements for the debug program are deleted from the ROM in the ROM cartridge. The deleted area in the ROM is left as an unusable area.

In the conventional debug apparatus and method for debugging a game program, however, there are disadvantages in that a game program area in a ROM is eroded, because, a debug program as well as the game program exists in a same ROM. If a size of the debug program is very large, a size of the game program is very small. Thus, the game becomes to be poor.

Therefore, a debug apparatus and a method for debugging a game program, in which the game program is able to use almost all ROM area, are necessary to be provided. Next, a debug apparatus and a method for debugging a game program in the first preferred embodiment according to the invention will be explained in FIGS. 5 to 8.

Figure 5:
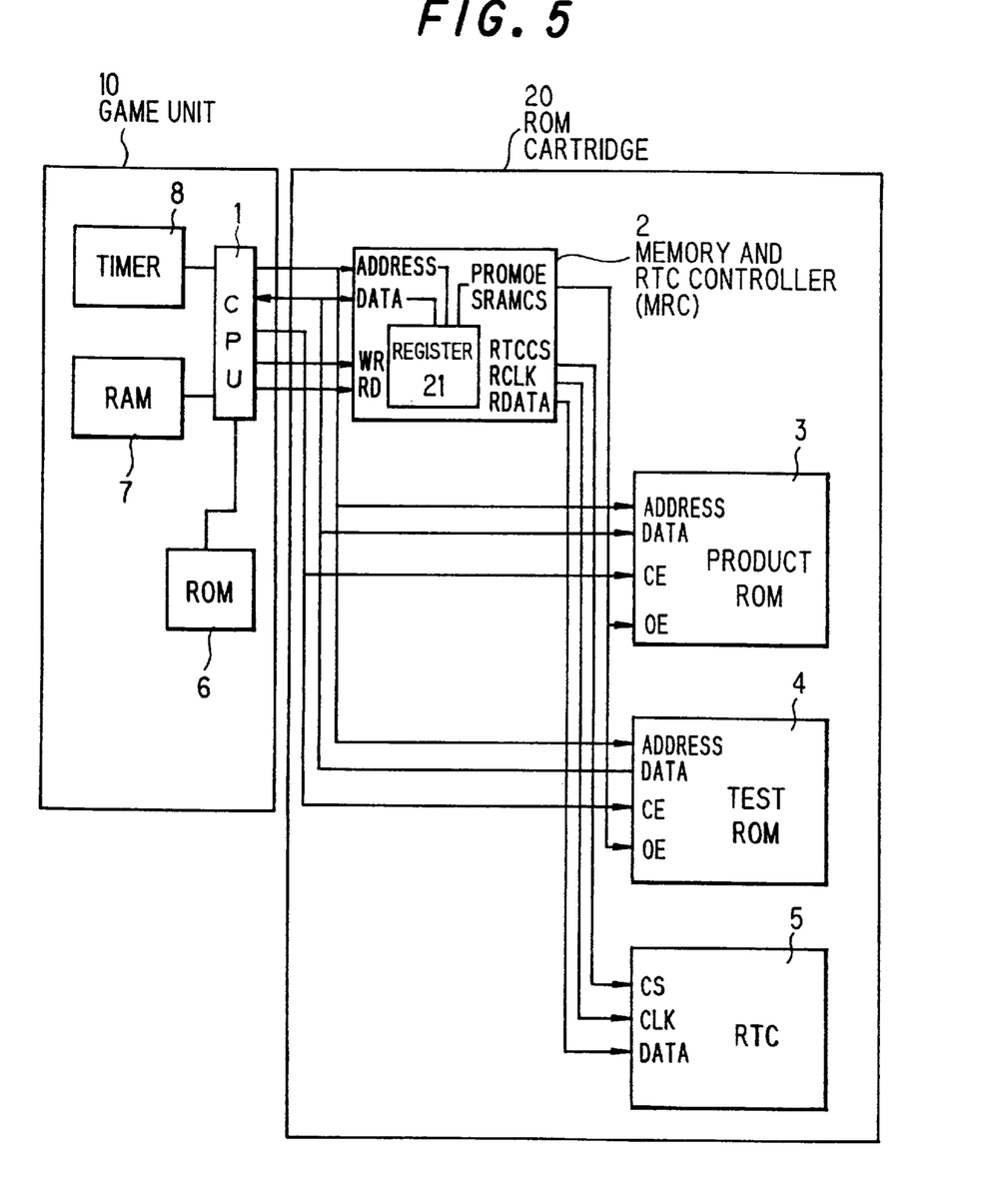
FIG. 5 is a block diagram of a debug system of the present invention.

FIG. 5 is a block diagram of a debug system of the present invention. In FIG. 5, the debug system comprises a game unit 10 and a ROM cartridge 20. The game unit 10 has a CPU 1, a ROM (Read only Memory) 6, a RAM (Random Access Memory) 7, and timer 8. The ROM cartridge 20 has a MRC (Memory and RTC controller) 2, a product ROM 3, a test ROM 4, and a RTC (Real Time Clock) 5.

The CPU 1, the ROM 6, and the RAM 7 are connected with each other in the game unit 10. The CPU 1 is for performing programs and instructions. The ROM 6 is for storing programs and instructions of an operating system of the debug system. The RAM 7 is used as a main memory by the CPU 1.

In the ROM cartridge 20, the product ROM 3 is for storing a virtual reality type game program. The test ROM 4 is for storing a debug program such as a time adjusting program. The RTC 5 is an IC (Integrated Circuit) having a clock function and a calendar function. A time of the game is corresponded with a real time by the clock function and the calendar function in the RTC 5. Namely, the RTC 5 saves year, month, day, day of the week, hour, minute, and second of the real time therein at the time of the game by using the clock function and the calendar function. Further the RTC 5 includes a battery. The RTC 5 is supplied with a power by the battery. Therefore, if the ROM cartridge 20 is detached from the game unit 10, the RTC 5 correctly saves the time of the game therein independent of the game unit 10. The MRC 2 is for controlling memory addresses of the game program in the product ROM 3 and the debug program in the test ROM 4. Further, the MRC 2 includes a register 21. The register 21 is for controlling a memory address of the debug program in the test ROM 4.

The game unit 10 is connected with the ROM cartridge 20 through I/O interfaces (is not shown). The CPU 1 accesses the product ROM 3, the test ROM 4, and the RTC 5 through the MRC 2. When the CPU 1 loads the game program from the product ROM 3 and contents in the RTC 5, the game program and the contents are placed on the fixed address area in the RAM 7 by the MRC 2. Then, the CPU 1 processes the game program according to the contents from the RTC 5.

In the above configuration, when the game program is debugged, the debug program is loaded form the test ROM 4 and placed on another address area in the RAM 7 by the register 21 in the MRC 2. Namely, in the RAM 7, the memory area of the game program for a product game is divided from the memory area of the debug program. Therefore, when the test ROM 4 is detached from a ROM cartridge 20, the memory area of the debug program is not accessed by the game program. Namely, a debug routine can be accessed by using only the register 21 and the game program can not access the debug routine. Further, when an error is occurred in the product RON cartridge which is detached the test ROM 4 therefrom (i.e. a user uses the product ROM cartridge without the test ROM 4), a debug environment is easy to be reconstructed by inserting the test ROM 4 into the product ROM cartridge and adjusting the register 21 in the MRC 2.

Figure 6:
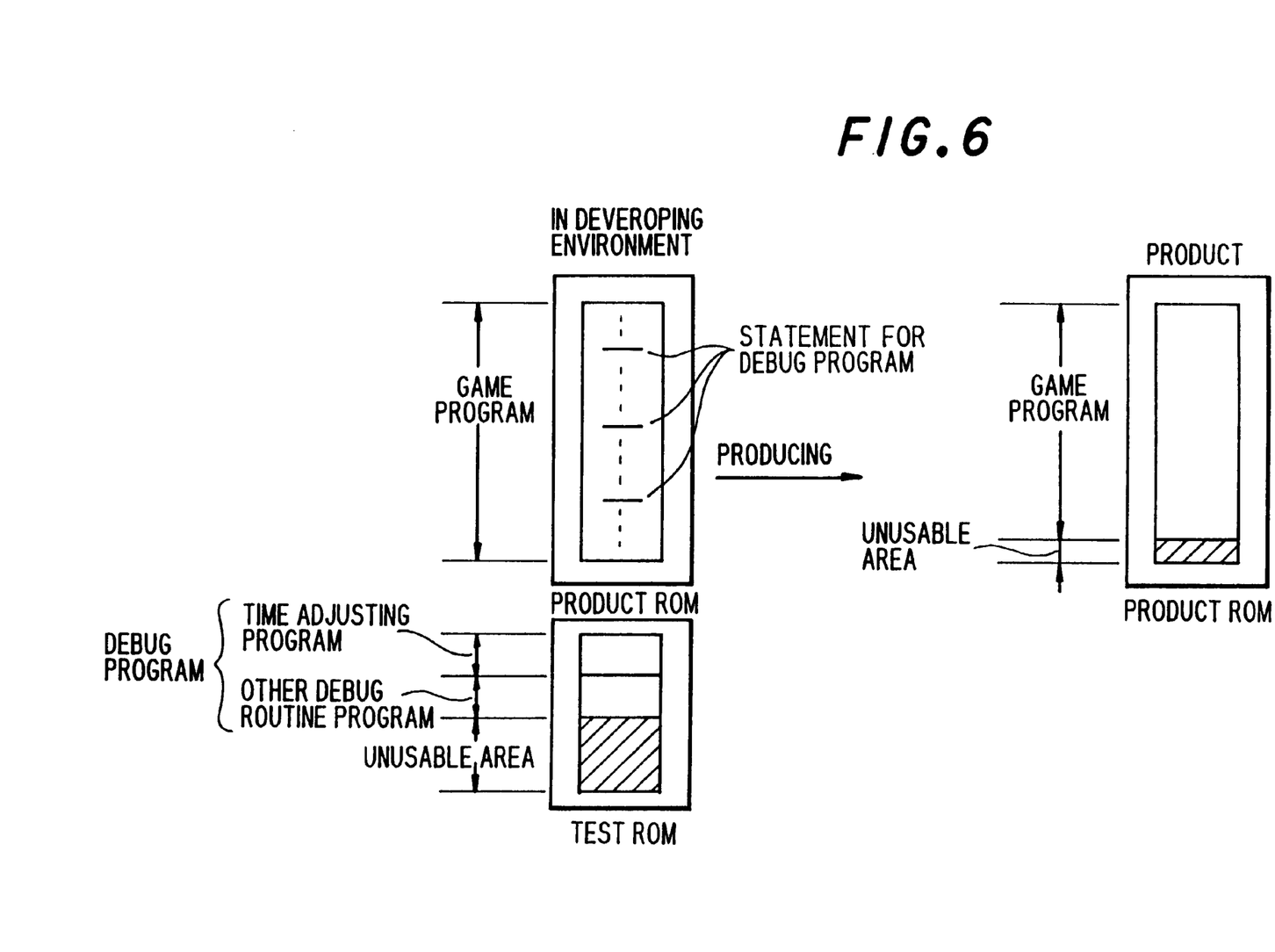
FIG. 6 is a block diagram of a product ROM and a test ROM in a ROM cartridge of the present invention.

FIG. 6 is a block diagram of a product ROM and a test ROM in a ROM cartridge of the present invention. In a developing environment, a game program exists in a product ROM and a debug program exists in another ROM which is a test ROM. The debug program includes a time adjusting program and other debug routine programs. The game program includes some statements for the debug program. When a ROM cartridge is produced as a product ROM cartridge, the test ROM is detached from the ROM cartridge and the statements for the debug program are deleted from the game program in the product ROM. The deleted area in the product ROM is left as an unusable area. However, the deleted area is very few, because the size of the statements for debug program is much fewer than the size of the debug program.

Figure 7:
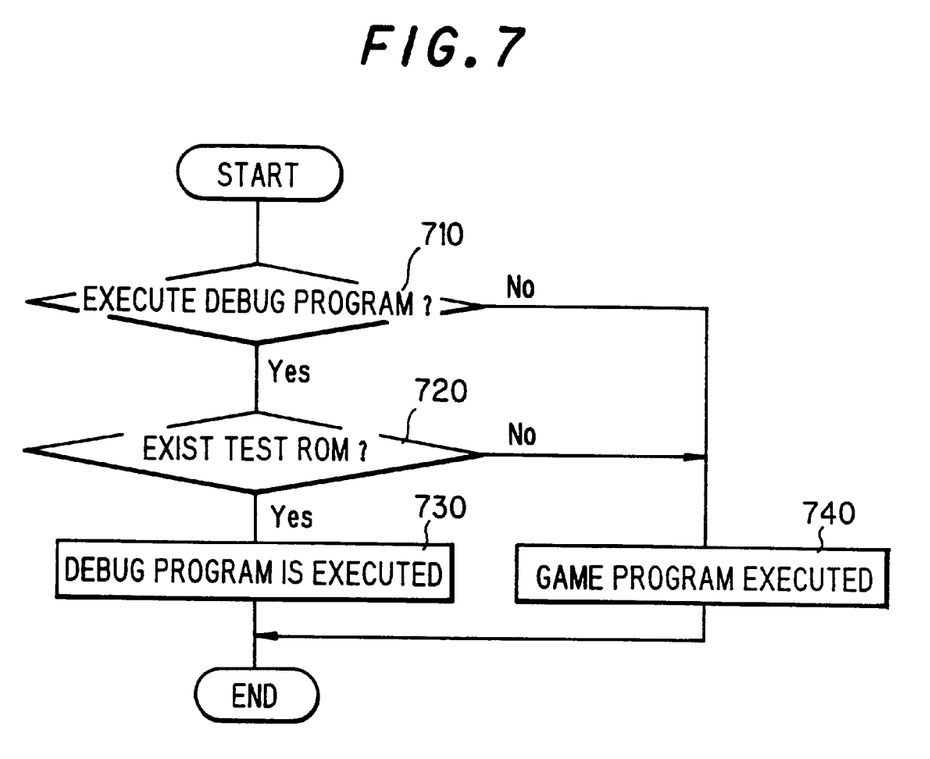
FIG. 7 is a flow chart of processing a debug program.

FIG. 7 is a flow chart of processing a debug program. When a debug process is started, "EXECUTE DEBUG PROGRAM ?" message is displayed on a display unit at the step 710. If "YES" is selected, the step 720 follows. If "NO" is selected, the step 740 follows. At the step 740, a game program is started. Then the debug process is ended. At the step 720, it is confirmed whether a test ROM for debug program exists in a ROM cartridge or not. If the test ROM exists in the ROM cartridge, the debug program is executed at the step 730. If the test ROM dose not exist, the game program is executed at the step 740.

Figure 8:
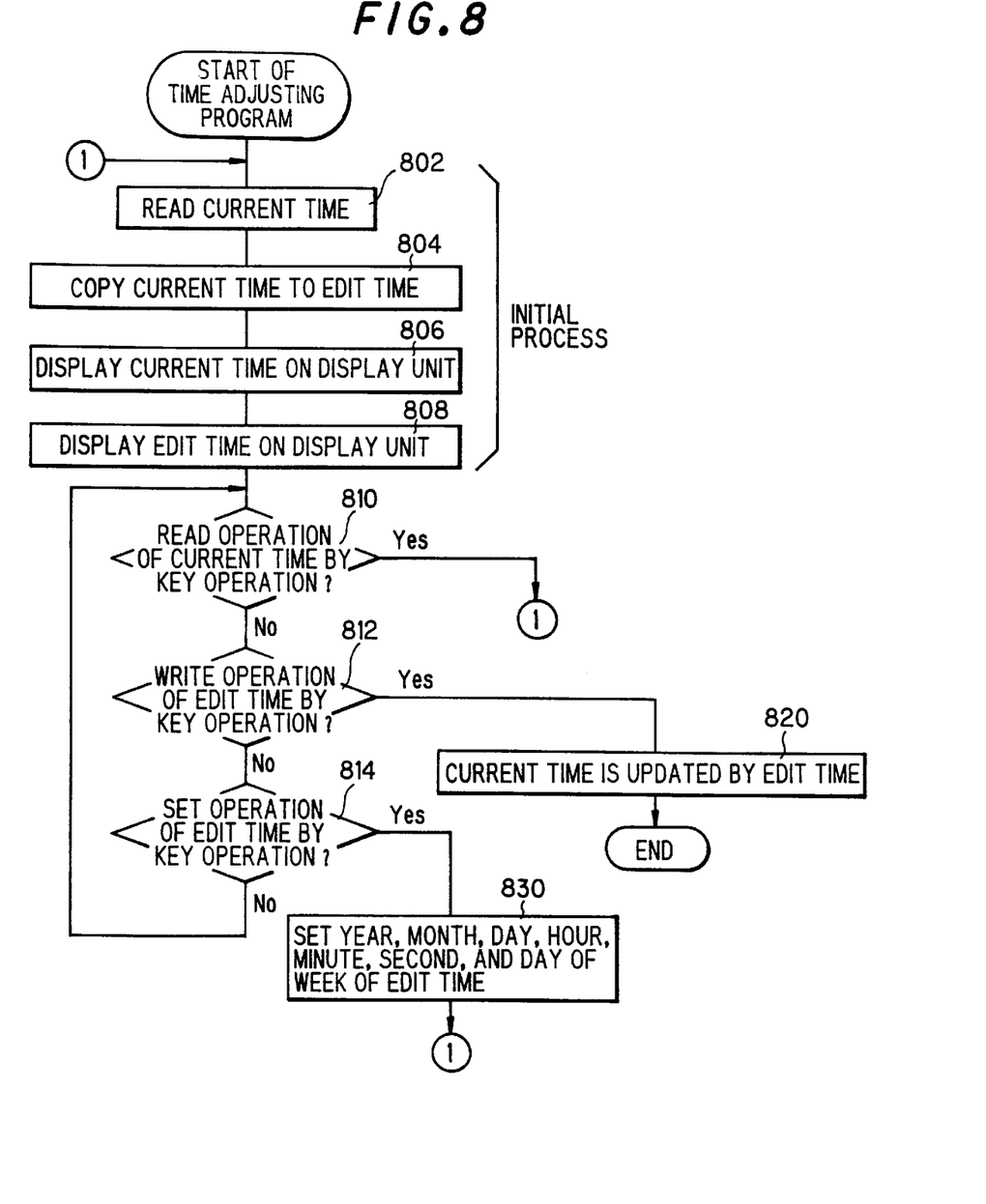
FIG. 8 is a flow chart of processing a time adjusting program of the debug program.

FIG. 8 is a flow chart of processing a time adjusting program of the debug program. When a time adjusting program is started, at the step 802, a current time is read from the RTC 5. The current time is a virtual real time but not a real time. At the step 804, the current time is copied to an edit time. The edit time is used as a work area for calculating a debugging time in the game. At the step 806, the current time is displayed on a display unit. At the step 808, the edit time is displayed on the display unit. The current time is changed with the RTC time. The edit time is fixed at the copied time. The steps 802 to 808 are in an initial process. At the step 810, when a read operation of the current time is operated by a key operation, the initial process is re-executed from the step 802 and then the edit time is updated by a new current time. If the read operation of the current time is not operated by the key operation at the step 810, the step 812 follows. At the step 812, when a write operation of the edit time is operated by the key operation, the step 820 follows. At the step 820, the current time in the RTC is updated by the edit time. If the write operation of the edit time is not operated by the key operation at the step 812, the step 814 follows. At the step 814, when a set operation of the edit time is operated by the key operation, the step 830 follows. At the step 830, Year, month, day, hour, minute, second, and day of the week of the edit time are updated by the key operation and then the initial process must be re-executed to update the RTC time.

In FIG. 8, after the step 820 the initial process can follow. In this case, the time adjusting process become to be a loop process without exit. The loop program is able to be stopped by an interrupt operation such as pushing the special key. Further, the time adjusting program is able to be started by another interrupt operation at the middle of the debug of the game program.

Therefore, the game program is able to use almost all product ROM area. Further, the game program can be debugged correctly.

As this invention may be embodied in several forms without departing from the sprit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. An external storage in a game apparatus comprising:
    a first storing means for storing a game program to be played by said game apparatus;
    means for controlling a time in a game; and
    a second storing means for storing a debug program for debugging said game program, said debug program including a time adjusting program.

2. A method for debugging a game program by a debug program in a game apparatus with an external storage comprising the steps of:
    storing said game program into first storage of said external storage;
    controlling a time in a game;
    storing said debug program into second storage of said external storage, said debug program including a time adjusting program; and
    debugging said game program by using said controlled time and said debug program including said time adjusting program.

* * * * *